United States Patent [19]

Thorup

[11] Patent Number: 5,230,646
[45] Date of Patent: Jul. 27, 1993

[54] APPARATUS FOR MOUNTING SONAR DEVICE TO FISHERMAN'S FLOAT TUBE

[76] Inventor: Douglas O. Thorup, 3048 S. Thorup Cir., West Valley City, Utah 84119

[21] Appl. No.: 792,694

[22] Filed: Nov. 15, 1991

[51] Int. Cl.⁵ .................................................. B63B 35/76
[52] U.S. Cl. ...................................... 441/131; 367/173
[58] Field of Search ........................ 367/173; 114/345; 441/136, 129–132; 440/2

[56] References Cited

U.S. PATENT DOCUMENTS

| | | | |
|---|---|---|---|
| 2,150,420 | 3/1939 | Cooper | 114/345 |
| 2,909,146 | 10/1959 | Strang | 440/85 |
| 4,784,624 | 11/1988 | Yoshida | 440/77 X |
| 4,980,872 | 12/1990 | Oler et al. | 367/173 |
| 5,016,225 | 5/1991 | Blomberg | 367/173 |

Primary Examiner—Sherman Basinger
Attorney, Agent, or Firm—Terry M. Crellin

[57] ABSTRACT

An improvement is disclosed for a fishing float tube of the type formed by a pneumatic tube having a seat in the mid portion thereof which supports a person seated in the seat when the tube is floating on a body of water. The improvement comprises apparatus to be used in combination with the float tube for mounting a sonar device on the float tube above the water line when the float tube is floating on a body of water. In addition, the apparatus accommodates mounting of a sonar transmitter below the water line. The sonar device is mounted so as to be visible by the fisherman using the float tube and allows the fisherman to determine optimum areas for fishing.

3 Claims, 2 Drawing Sheets

APPARATUS FOR MOUNTING SONAR DEVICE TO FISHERMAN'S FLOAT TUBE

BACKGROUND OF THE INVENTION

1. Field of the Invention

The present invention relates to improvements in float tubes used by fishermen to float on the surface of a body of water. More particularly, the present invention relates to apparatus for mounting a sonar device to float tubes.

2. State of the Art

Pneumatic tubes having a seat for supporting a person floating on a body of water are commonly referred to as float tubes. Rather than use a boat, many fishermen use the float tubes for fishing while floating in relative isolation from others on a body of water. The fisherman usually puts on waterproof waders and sits in a seat built in to the float tube. The float tube is quite similar to an inflated rubber inner tube, but has a seat positioned in the open torus of the tube for the fisherman to sit in. The fisherman's legs and feet are suspended in the water beneath the float tube. The fisherman usually wears a pair of flippers on his feet to act as a means of propulsion.

Examples of float tubes and variations in their construction a shown in U.S. Pat. Nos. 4,687,452; 4,601,667; 3,324,488; 2,958,876; and 2,894,270. It has been suggested to improve float tubes by providing powered means for propelling the float tube on the surface of the body of water rather than requiring the fisherman to use flippers on his feet for propulsion. See, for example, U.S. Pat. No. 4,938,722. To the present inventor's knowledge there has been no suggestion of an improvement in a float tube whereby a sonar device can be carried on the float tube to determine the conditions in the water beneath the float tube. Such sonar devices themselves are commercially available for being mounted permanently on a boat. The sonar units are commonly called fish finders and do indeed aid the fisherman in finding the optimum place for fishing. It would be highly desirable to provide improved means for employing such sonar devices with fishermen's float tubes.

3. Objective

The principal objective of the present invention is to provide a novel, improved means for mounting a sonar device on a float tube above the water line when the float tube is floating on a body of water, with the sonar transmitter being mounted below the water line thereby providing an improvement in fishermen's float tubes that will greatly increase the usefulness of the float tubes by allowing the fisherman to position the float tube in an area of the body of water for optimum fishing.

BRIEF DESCRIPTION OF THE INVENTION

The above objective is achieved in accordance with the present invention by providing novel, improvement in a float tube for mounting a sonar device on the float tube to be positioned above the water line when the float tube is floating on a body of water and in view of the fisherman sitting in the float tube. The improvement for mounting the sonar device to the float tube comprises strap means that are to be attached to the float tube. The strap means are coupled to a mounting plate and are adapted to hold the mounting plate firmly to the outer perimeter of the float tube when the strap means are attached to the float tube.

A support arm extends from the mounting plate substantially radially away from the float tube. The support arm is held above the water line when the float tube is floating on a body of water. Means are provided for mounting a commercially available sonar device on the support arm so that the sonar device is positioned above the water line when the float tube is floating on a body of water. Further, the sonar device is positioned so that it can be viewed by the fisherman sitting in the float tube. Means are further provided for supporting a sonar transducer below the water line when the float tube is floating on a body of water. The sonar transducer is electrically coupled to the sonar device by an electrical transducer feed line connected between the transducer and the sonar device.

Additional objects and features of the invention will become apparent from the following detailed description, taken together with the accompanying drawings.

THE DRAWINGS

A preferred embodiment of the present invention representing the best mode presently contemplated of carrying out the invention is illustrated in the accompanying drawings in which:

FIG. 1 is a pictorial representation of a fisherman's float tube incorporating the improvement of the present invention for mounting a sonar device to the float tube; and FIG. 2 is a pictorial representation of the apparatus used in mounting the sonar device to the float tube of FIG. 1.

DETAILED DESCRIPTION OF THE ILLUSTRATED EMBODIMENT

Figure 1:
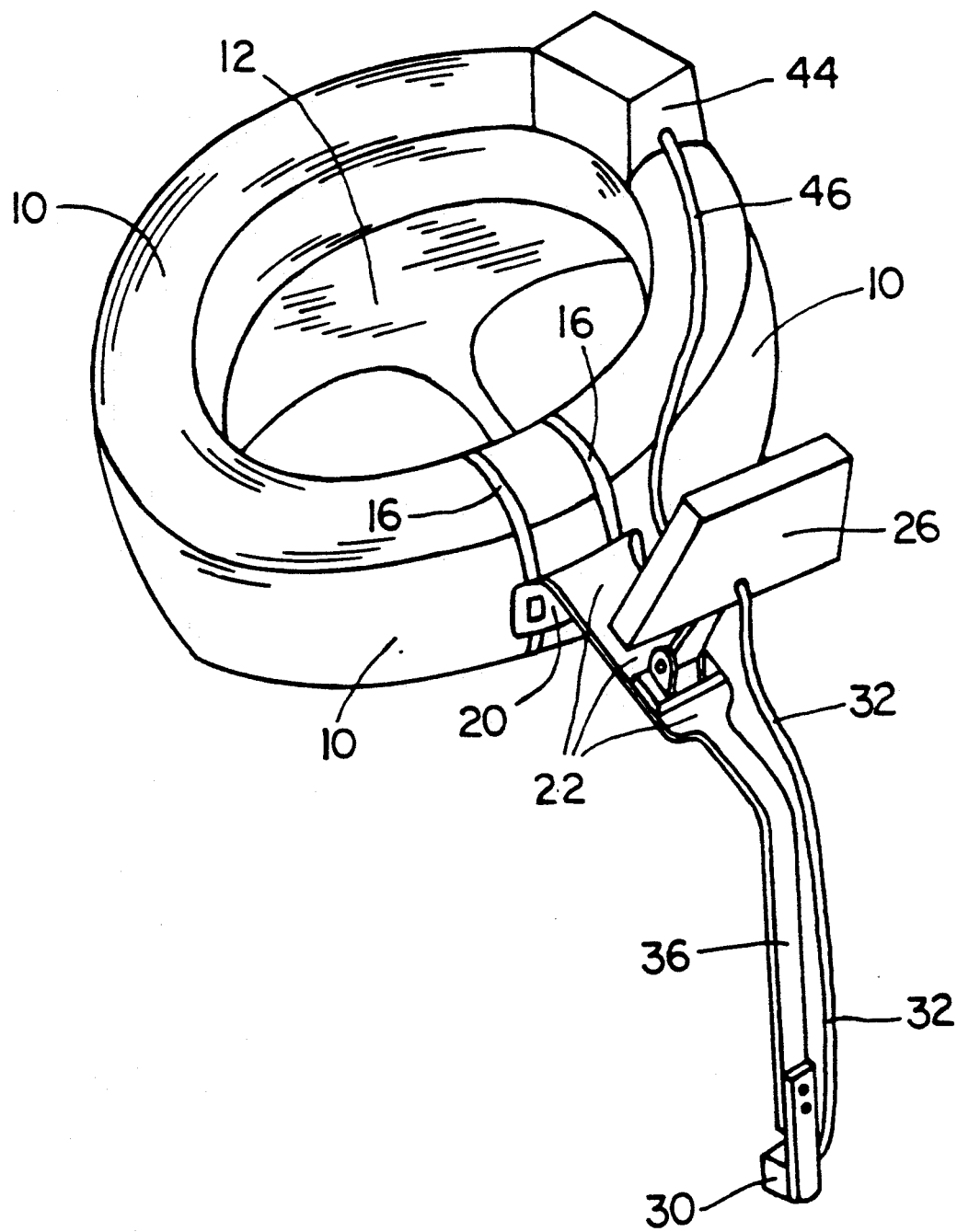

Referring now to the drawings there is shown in FIG. 1 a fishing float tube of the type formed by a conventional pneumatic tube 10 having a seat 12 in the mid portion or torus thereof which supports a person seated in the seat 12 when the tube 10 is floating on a body of water. The improvement of the present invention comprises novel means for mounting a sonar device on the float tube 10 above the water line when the float tube is floating on a body of water. The improved mounting means is shown attached to the pneumatic tube 10 and a pictorial representation of the improved mounting means is shown in isolation in FIG. 2.

Figure 2:
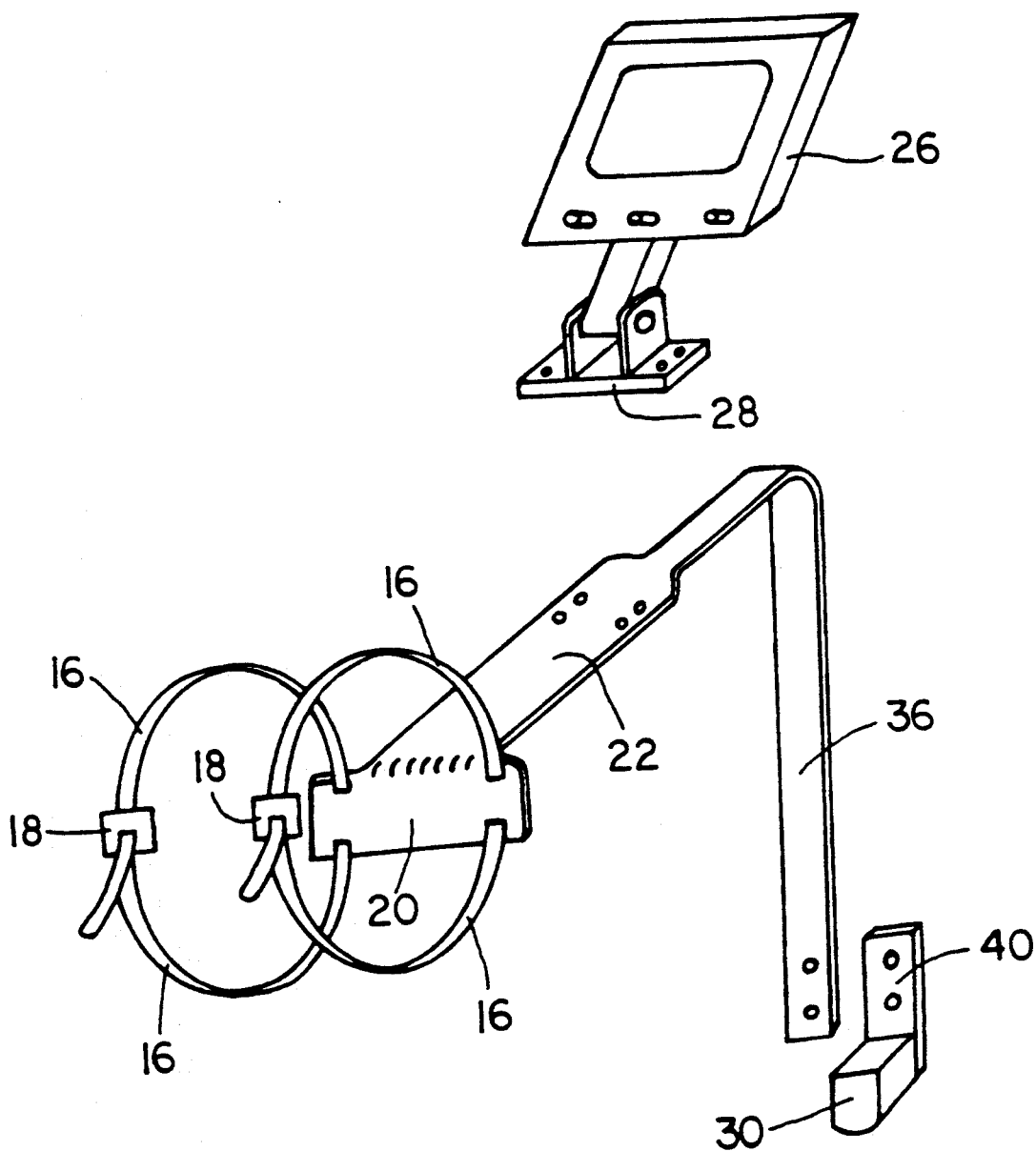

As illustrated, the novel means for mounting the sonar device on the float tube 10 comprises strap means, which as shown in the drawings take the form of two spaced apart straps 16 that are attached to the float tube 10 by encircling the float tube. The straps 16 are attached using buckle members 18 as shown in FIG. 2.

A mounting plate 20 is attached to the straps 16 so as to be supported on the outer perimeter of the float tube 10 when the straps 16 are attached to the float tube 10. The mounting plate 20 is held in firm flatwise engagement with the outer perimeter of the float tube 10, and the buckles 18 are cinched so as to tighten the straps 16 on the tube 10 and prevent movement of the straps 16 or the mounting plate 20 relative to the tube 10.

A support arm 22 extends from the mounting plate 20 to project outwardly substantially radially away from the float tube 10 and above the water line when the float tube 10 is floating on a body of water. The mounting plate 20 and the support arm 22 can be made of metal or plastic. In either case, the mounting plate 20 and support arm 22 are formed integrally with each other. If made of metal, the support arm portion 22 is simply bent at a 90 degree angle with the mounting plate portion 20. If the unit is cast of plastic material, the support arm 22 and mounting plate 20 are molded so as to be oriented at 90 degrees with each other.

Means are provided for mounting a sonar device 26 on the support arm 22 so that the sonar device 26 is positioned above the water line when the float tube 10 is floating on a body of water. The sonar device 26 is mounted so that it can be viewed by a person sitting in the float tube 10 when the float tube is floating on a body of water. The sonar device is a commercially available device commonly known as a fish finder. Ordinarily, such fish finders are marketed to be permanently mounted on a boat.

Means are also provided for supporting a sonar transducer 30 below the water line when the float tube 10 is floating on a body of water, and an electrical transducer feed line 32 interconnects the transducer 30 with the sonar device 26. Advantageously, the means for supporting the sonar transducer 30 comprises an elongate extension 36 extending downwardly from the radially extending end of the support arm 22. Means are provided for mounting the sonar transducer 30 to the downwardly extending end of the elongate extension 36.

The elongate extension 36 is, of course, made of the same material as the mounting plate 20 and support arm 22. When that material is metal, the entire unit is stamped out of the sheet metal blank, with the support arm 22 being bent at an angle of substantially 90 degrees to the mounting plate 20, and the elongate extension 36 is bent at an angle of substantially 90 degrees with respect to the support arm 22 as shown in FIG. 2. When the material from which the mounting apparatus is made is plastic, the mounting plate 20, the support arm 22 and the elongate extension 36 are molded as an integral unit as shown in FIG. 2.

Commercially available sonar devices 26, commonly called fish finders, universally have a mounting plate 28 in which mounting holes are formed. The mounting plate 20 of the present apparatus is provided with mounting holes that match the mounting holes in the sonar device 26, and screws or bolts (not shown in the drawings) are used to connect the sonar device 26 to the mounting plate 20 through the matched, aligned mounting holes.

The sonar transducer 30 is advantageously mounted to a mounting finger 40 as shown in FIG. 2. The mounting finger 40 is adapted to lie alongside the lower end portion of the elongate extension 36. Mated holes are provided in the mounting finger 40 and the lower end portion of the elongate extension 36 to accept screws or bolts (not shown in the drawings) to secure the mounting finger 40 to the elongate extension 36.

Advantageously, the improvement in accordance with the present invention is further provided with means for mounting an electric storage battery on the float tube 10 above the water line when the float tube is floating on a body of water. As illustrated, a battery container 44 for retaining a replaceable battery is mounted on the back or side of the pneumatic tube 10, and an electrical power feed line 46 connects the electrical storage battery in the battery container 44 to the sonar device.

Although a preferred embodiment of the improved fisherman's float tube of the present invention has been illustrated and described, it is to be understood that the present disclosure is made by way of example and that various other embodiments are possible without departing from the subject matter coming within the scope of the following claims, which subject matter is regarded as the invention.

I claim:
1. In a fishing float tube of the type formed by a pneumatic tube in the shape of a torus and having a seat in the mid portion thereof for supporting one person seated in the seat when the tube is floating on a body of water, the improvement comprising means for mounting a sonar device on the float tube above the water line when the float tube is floating on a body water, with a sonar transmitter being mounted below water line, said means for mounting the sonar device on said float tube comprising a pair of spaced apart straps that encircle said float tube;

a mounting plate extending between said pair of straps and being attached to said straps so as to be supported substantially flatwise on the outer perimeter of the float tube when said straps are attached to said float tube;

an elongate support arm extending from an upper edge of said mounting plate to extend substantially radially away from said float tube and above the water line when the float tube is floating on a body of water;

an elongate extension extending downwardly from the radially extending end of said support arm;

means for mounting the sonar device on said support arm so that the sonar device is positioned above the water line when the float tube is floating on a body of water and so that the sonar device can be viewed by a person sitting in said float tube; and means for supporting a sonar transducer on said elongate extension below the water line when the float the is floating on a body of water, with an electrical transducer feed line connecting the transducer to the sonar device.

2. The improvement in accordance with claim 1 wherein the sonar transducer is mounted to the downwardly extending end of said elongate extension.

3. The improvement in accordance with claim 1 wherein there is further provided means for mounting an electric storage battery on the float tube above the water line when the float tube is floating on a body of water; and an electrical power feed line connecting the electrical storage battery to the sonar device.

* * * * *